United States Patent
Li et al.

(10) Patent No.: US 12,062,248 B2
(45) Date of Patent: Aug. 13, 2024

(54) DISPLAY PANEL AND DISPLAY DEVICE

(71) Applicant: BOE Technology Group Co., Ltd., Beijing (CN)

(72) Inventors: Changfeng Li, Beijing (CN); Xiaochuan Chen, Beijing (CN); Fuqiang Li, Beijing (CN); Liwei Liu, Beijing (CN); Hongrun Wang, Beijing (CN); Hui Zhang, Beijing (CN); Shunhang Zhang, Beijing (CN); Kai Hou, Beijing (CN); Yunsik Im, Beijing (CN); Yunping Di, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 76 days.

(21) Appl. No.: 18/009,220

(22) PCT Filed: May 25, 2021

(86) PCT No.: PCT/CN2021/095636
§ 371 (c)(1),
(2) Date: Dec. 8, 2022

(87) PCT Pub. No.: WO2021/249178
PCT Pub. Date: Dec. 16, 2021

(65) Prior Publication Data
US 2023/0215211 A1  Jul. 6, 2023

(30) Foreign Application Priority Data
Jun. 9, 2020 (CN) .......................... 202010518762.6

(51) Int. Cl.
*G06V 40/13* (2022.01)
*G02F 1/1335* (2006.01)
(Continued)

(52) U.S. Cl.
CPC .... *G06V 40/1318* (2022.01); *G02F 1/136209* (2013.01); *G02F 1/136222* (2021.01); *G02F 1/136286* (2013.01); *G02F 1/1368* (2013.01)

(58) Field of Classification Search
CPC .......... G06V 40/1318; G02F 1/136209; G02F 1/136222; G02F 1/136286; G02F 1/1368;
(Continued)

(56) References Cited

U.S. PATENT DOCUMENTS 11,348,977 B2   5/2022 Sun et al.
2010/0321356 A1  12/2010 Brown et al.
(Continued)

FOREIGN PATENT DOCUMENTS

CN   101946328 A   1/2011
CN   106373969 A   2/2017
(Continued)

OTHER PUBLICATIONS

Aug. 30, 2021—(CN) International Search Report Appn PCT/CN2021/095636 with English Translation.
(Continued)

*Primary Examiner* — Antonio Xavier
(74) *Attorney, Agent, or Firm* — Banner & Witcoff, Ltd.

(57) ABSTRACT

A display panel and a display device are provided. The display panel has a touch side and includes an array substrate and an opposite substrate arranged opposite to each other. The array substrate includes an image sensor array including a plurality of image sensors each including a photosensitive element configured to receive light reflected by a texture touched on the touch side for texture acquisition; the opposite substrate includes a light shielding layer including a plurality of first openings arranged in an array, and the plurality of first openings are in one-to-one correspondence with and partially overlap with the photosensitive elements
(Continued)

of the plurality of image sensors in a direction perpendicular to a panel surface of the display panel.

18 Claims, 12 Drawing Sheets

(51) Int. Cl.
*G02F 1/1362* (2006.01)
*G02F 1/1368* (2006.01)

(58) Field of Classification Search
CPC .......... G02F 1/13312; G02F 1/133512; G02F 1/13338; G02F 1/1362; G02F 2201/58; G02F 1/1333; G02F 1/133514; G02F 1/1336; G02F 1/133606; G02F 1/1343; G02F 1/136227; G02B 6/00; G02B 6/005; G02B 6/0053; G06F 3/0412
See application file for complete search history.

(56) References Cited

U.S. PATENT DOCUMENTS

| | | | |
|---|---|---|---|
| 2018/0039012 A1 | 2/2018 | Shin et al. | |
| 2019/0280039 A1 | 9/2019 | Jia et al. | |
| 2020/0310210 A1* | 10/2020 | Zhang | H10K 59/50 |
| 2020/0311374 A1* | 10/2020 | Kim | G06F 3/0412 |

FOREIGN PATENT DOCUMENTS

| | | |
|---|---|---|
| CN | 108415188 A | 8/2018 |
| CN | 109389108 A | 2/2019 |
| CN | 109716352 A | 5/2019 |
| CN | 110008885 A | 7/2019 |
| CN | 110161739 A | 8/2019 |
| CN | 110187546 A | 8/2019 |
| CN | 110222600 A | 9/2019 |
| CN | 110263773 A | 9/2019 |
| CN | 110290241 A | 9/2019 |
| CN | 110690227 A | 1/2020 |
| CN | 110764304 A | 2/2020 |
| CN | 110808272 A | 2/2020 |
| CN | 110955083 A | 4/2020 |
| CN | 111007680 A | 4/2020 |
| CN | 111539340 A | 8/2020 |
| CN | 111552109 A | 8/2020 |
| JP | 2001109394 A | 4/2001 |
| KR | 20190130086 A | 11/2019 |

OTHER PUBLICATIONS

Apr. 25, 2022—(CN) First Office Action Appn 202010518762.6 with English Translation.

* cited by examiner

DISPLAY PANEL AND DISPLAY DEVICE

The application is a U.S. National Phase Entry of International Application PCT/CN2021/095636 filed on May 25, 2021, designating the United States of America and claiming priority to Chinese Patent Application No. 202010518762.6 filed on Jun. 9, 2020. The present application claims priority to and the benefit of the above-identified applications and the above-identified applications are incorporated by reference herein in their entirety.

TECHNICAL FIELD

Embodiments of the present disclosure relate to a display panel and a display device.

BACKGROUND

Texture recognition technology combined with optical imaging has been gradually adopted by display devices for identity verification, electronic payment and other functions because of the uniqueness of skin texture such as fingerprint pattern or palm pattern. Existing display devices are developing towards large screen and full screen. Therefore, how to design a more optimized display device combined with texture recognition function on the premise of large screen and full screen is the focus of attention in the related fields.

SUMMARY

At least one embodiment of the present disclosure provides a display panel having a touch side and including an array substrate and an opposite substrate arranged opposite to each other, wherein the array substrate includes an image sensor array including a plurality of image sensors, and each of the plurality of image sensors includes a photosensitive element configured to receive light reflected by a texture touched on the touch side for texture acquisition; and the opposite substrate includes a light shielding layer including a plurality of first openings arranged in an array, and the plurality of first openings are in one-to-one correspondence with and at least partially overlap with the photosensitive elements of the plurality of image sensors in a direction perpendicular to a panel surface of the display panel.

For example, in the display panel provided by at least one embodiment of the present disclosure, the array substrate further includes a plurality of sub-pixels arranged in an array, the light shielding layer further includes a plurality of second openings arranged in an array and a plurality of color filters respectively arranged in the plurality of second openings, and the plurality of color filters are in one-to-one correspondence with and at least partially overlap with the plurality of sub-pixels in the direction perpendicular to the panel surface of the display panel.

For example, in the display panel provided by at least one embodiment of the present disclosure, for one first opening and one image sensor that are correspondingly arranged, an orthographic projection of the first opening on the panel surface of the display panel is inside an orthographic projection of the photosensitive element of the image sensor on the panel surface of the display panel.

For example, in the display panel provided by at least one embodiment of the present disclosure, for one first opening and one image sensor that are correspondingly arranged, a distance between an edge of the orthographic projection of the first opening on the panel surface of the display panel and an edge of the orthographic projection of the photosensitive element of the image sensor on the panel surface of the display panel is 0 µm to 5 µm.

For example, in the display panel provided by at least one embodiment of the present disclosure, a planer shape of each of the plurality of first openings is square or rectangular shape, and a length×a width of the planer shape is 10 µm×10 µm to 50 µm×50 µm.

For example, in the display panel provided by at least one embodiment of the present disclosure, each of the plurality of image sensors further includes at least one switching element, the photosensitive element includes a first electrode, a second electrode and a semiconductor layer between the first electrode and the second electrode, wherein the first electrode is electrically connected with the at least one switching element through a first via hole, and the semiconductor layer partially overlaps with or has no overlap with the first via hole in the direction perpendicular to the panel surface of the display panel.

For example, in the display panel provided by at least one embodiment of the present disclosure, the array substrate further includes a base substrate and a first planarization layer, wherein the at least one switching element is arranged on the base substrate, and the at least one switching element includes a switching transistor, the switching transistor includes an active layer, a gate electrode and a source-drain electrode; the first planarization layer is arranged at a side of the switching transistor away from the base substrate to provide a flat surface; the first electrode is arranged at a side of the first planarization layer away from the base substrate; the first planarization layer has the first via hole; and the first electrode is electrically connected with the source-drain electrode through the first via hole.

For example, in the display panel provided by at least one embodiment of the present disclosure, each of the plurality of sub-pixels includes a pixel driving circuit, the pixel driving circuit is arranged on the base substrate and includes a thin film transistor, and the thin film transistor is arranged in a same layer as the switching transistor.

For example, in the display panel provided by at least one embodiment of the present disclosure, the array substrate further includes a first connection electrode, a second planarization layer, a second connection electrode and a connection trace, wherein the first planarization layer also has a second via hole, the first connection electrode is electrically connected with a source-drain electrode of the thin film transistor through the second via hole, and the first connection electrode and the first electrode are arranged in a same layer; the semiconductor layer and the second electrode are sequentially arranged on the first electrode; the second planarization layer is arranged at a side of the first connection electrode and the second electrode away from the base substrate, the second planarization layer has a third via hole and a fourth via hole, the second connection electrode is electrically connected with the first connection electrode through the third via hole, the connection trace is electrically connected with the second electrode through the fourth via hole, and the connection trace is arranged in a same layer as the second connection electrode.

For example, in the display panel provided by at least one embodiment of the present disclosure, the array substrate further includes a third planarization layer and a pixel electrode, wherein the third planarization layer is arranged at a side of the second connection electrode and the connection trace away from the base substrate, and the third planarization layer has a fifth via hole through which the pixel electrode is electrically connected with the second connection electrode.

For example, the display panel provided by at least one embodiment of the present disclosure further includes a common electrode, wherein the common electrode is arranged on the array substrate and insulated from the pixel electrode through an insulating layer; or the common electrode is arranged on the opposite substrate.

For example, in the display panel provided by at least one embodiment of the present disclosure, the at least one switching element includes a first switching transistor, a second switching transistor and a third switching transistor, the first electrode is electrically connected with a source-drain electrode of the third switching transistor through the first via hole, the first electrode is also electrically connected with a gate electrode of the second switching transistor, and a source-drain electrode of the second switching transistor is electrically connected with a source-drain electrode of the first switching transistor.

For example, in the display panel provided by at least one embodiment of the present disclosure, the plurality of sub-pixels are arranged in an array of multiple rows and multiple columns, the display panel also includes a scanning line extending between two adjacent rows of sub-pixels, and the scanning line is configured to provide a scanning signal for the plurality of sub-pixels; at least some of the plurality of image sensors are arranged between two adjacent rows of sub-pixels, and an extending direction of the photosensitive elements of the at least some of the plurality of image sensors is as same as an extending direction of the scanning line.

For example, in the display panel provided by at least one embodiment of the present disclosure, the photosensitive elements of the at least some of the plurality of image sensors have no overlap with the scanning line in the direction perpendicular to the panel surface of the display panel.

For example, the display panel provided by at least one embodiment of the present disclosure further includes a liquid crystal layer between the array substrate and the opposite substrate, wherein the display panel is further configured to control the liquid crystal layer in response to a control signal so that a first area is in a light-transmitting state.

At least one embodiment of the present disclosure provides a display device, including any one of the display panels above, and a backlight assembly arranged at a side of the array substrate away from the opposite substrate and configured to provide backlight for the display panel in operation.

For example, in the display device provided by at least one embodiment of the present disclosure, the backlight assembly includes a surface light source and a light constraining layer, the light constraining layer is located at one side of the surface light source close to the display panel, and is configured to constrain light emitted from the surface light source in the direction perpendicular to the panel surface of the display panel.

For example, in the display device provided by at least one embodiment of the present disclosure, the surface light source includes a light guide plate and at least one light-emitting element arranged at at least one side of the light guide plate, and light emitted by the at least one light-emitting element is incident into the light guide plate from the at least one side and exits from a plate surface of the light guide plate facing the light constraining layer; or the surface light source includes a light-emitting element array including a plurality of light-emitting elements arranged in multiple rows and multiple columns in a plane parallel to the display panel.

For example, in the display device provided by at least one embodiment of the present disclosure, the light constraining layer includes an inverse prism and an anti-peeping film, and the inverse prism is arranged at a side of the anti-peeping film close to the surface light source; the inverse prism is configured to collimate the light emitted from the surface light source in the direction perpendicular to the panel surface of the display panel by means of refraction effect; and the anti-peeping film is configured to only emit light having an included angle within 30 degrees with respect to a normal direction of the anti-peeping film.

For example, in the display device provided by at least one embodiment of the present disclosure, the anti-peeping film includes a plurality of prismatic protrusions arranged in parallel, and an extending direction of the plurality of prismatic protrusions is perpendicular to an extending direction of a scanning line extending between two adjacent rows of sub-pixels in the display panel.

BRIEF DESCRIPTION OF THE DRAWINGS

In order to more clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

Figure 1A:
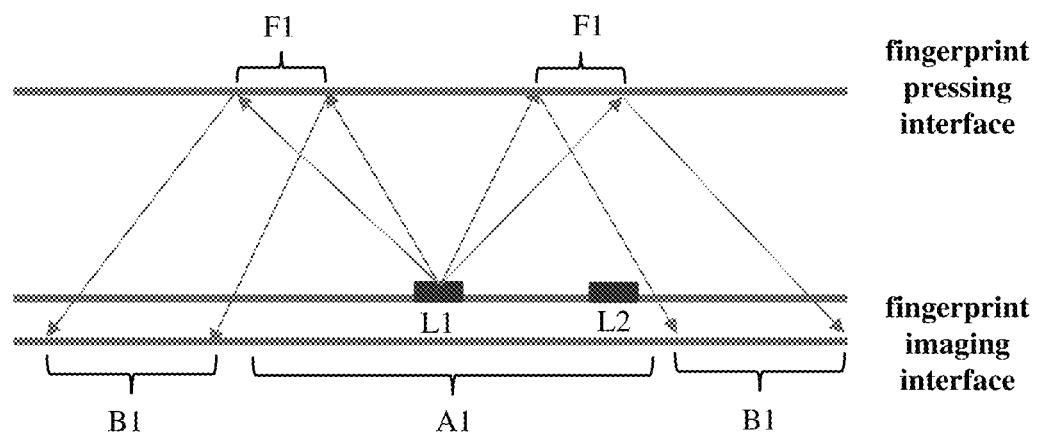
FIG. 1A is a schematic diagram of fingerprint imaging.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

At present, narrow bezel has gradually become the mainstream in the design and manufacture of display devices, especially for portable display devices such as mobile phones. One of the means to realize narrow bezel is to integrate an image sensor having fingerprint recognition function into the display device, so as to realize under-screen fingerprint recognition mode, and hence increase the display area of the display device, thereby improving the screen ratio.

For example, a point light source, a line light source or a light source with a certain pattern can be used as a photosensitive light source of the image sensor for fingerprint identification. Moreover, there are many ways to arrange the light source and the image sensor. For example, the light source can be arranged at the side of the image sensor close to the fingerprint touch, or the light source can be arranged in the same plane as the image sensor, or the light source can be arranged at the side of the image sensor away from the fingerprint touch. The arrangement mode of the light source and the image sensor can be selected and set according to different requirements.

In the following, the principle of fingerprint identification will be introduced with reference to the case where a point light source is used as the photosensitive light source of the image sensor and the light source is arranged at the side of the image sensor close to the fingerprint touch, without limiting the embodiments of the present disclosure thereto.

In a reflective optical fingerprint identification device, as shown in FIG. 1A, in the process of fingerprint identification, when a point light source L1 emits light, the emitted light irradiates on a fingerprint pressing interface (e.g., an outer surface of a glass screen) at different angles. Due to the effect of total reflection at the fingerprint pressing interface, a part of the light having an incident angle greater than or equal to the critical angle θ of the total reflection will be totally reflected, so that this part of the light can't be emitted from the fingerprint pressing interface, resulting in a total reflection area. Accordingly, another part of the light having an incident angle smaller than the critical angle θ of total reflection is emitted from the fingerprint pressing interface. Therefore, a texture image can be acquired by the light reflected at the total reflection area. For example, a clear texture image is formed at B1 of the fingerprint imaging interface where the image sensor is located, and this texture image corresponds to a part of the fingerprint located at F1, i.e., F1 is the total reflection area and B1 is the imaging area.

Specifically, when the fingerprint of a user's finger, for example, is pressed onto the total reflection area F1, the ridge of the fingerprint touches the surface of the total reflection area F1, so that the total reflection condition at the position corresponding to the ridge of the fingerprint is destroyed, and the light will be emitted at this corresponding position, resulting in a change of the original reflection path; while the valley of the fingerprint will not touch the surface of the total reflection area F1, so that the total reflection condition at the position corresponding to the valley of the fingerprint is not destroyed, the light will still be totally reflected at this corresponding position, and the original reflection path is not destroyed either. In this way, due to the different influences of the valley and the ridge of the fingerprint on the total reflection conditions, the light incident on the fingerprint imaging interface forms alternately bright and dark texture images at different positions.

In addition, due to the interference caused by the light emitted from the fingerprint pressing interface and reflected by the fingerprint, or because the light emitted by the light source is reflected to the fingerprint imaging interface by other functional layers before reaching the fingerprint pressing interface, A1 of the fingerprint imaging interface becomes an invalid detection area which cannot form an effective texture image. In the invalid area A1, for the light emitted by the light source L1, a part that is reflected to the fingerprint imaging interface by other functional layers before reaching the fingerprint pressing interface and another part that is almost vertically reflected by the fingerprint pressing interface have higher brightness, and are basically located in the center of the invalid area A1, thus forming a highlight area. This highlight area generates a larger photoelectric signal in the corresponding part of the image sensor array because of the higher brightness of light, and is easy to form an afterimage, thus can also be called an afterimage area.

Figure 1B:
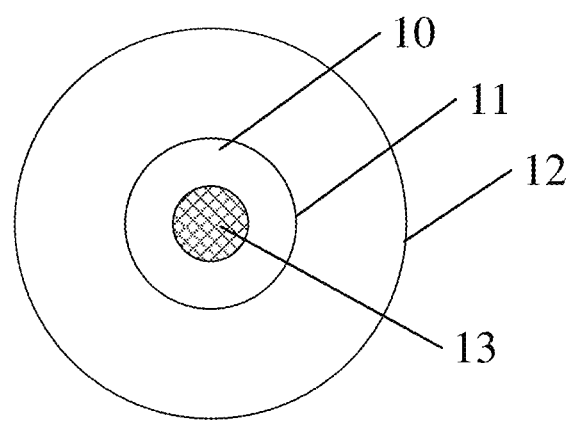
FIG. 1B is a schematic diagram of an imaging range of a point light source.

For example, FIG. 1B is a schematic diagram illustrating an imaging range of a point light source. As shown in FIG. 1B, in the photosensitive range of the point light source, the effective imaging range is in an annular shape; that is to say, in FIG. 1B, the annular area between the inner circle 11 and the outer circle 12 is the effective imaging range which corresponds to the imaging area B1 corresponding to the total reflection area F1 in FIG. 1A; the annular-shaped area (hereinafter referred to as an annular center 10) located inside the inner circle 11 is an invalid imaging area corresponding to the invalid area A1 in FIG. 1A; a part of the area (the shaded area) 13 inside the annular center 10 is a highlight area (afterimage area), which easily leads to afterimage in the image sensor array during imaging.

Figure 1C:
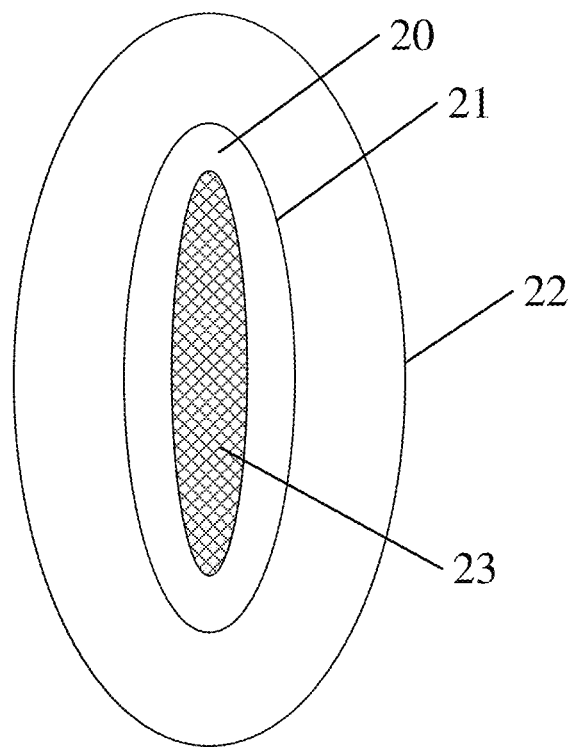
FIG. 1C is a schematic diagram of an imaging range of a line light source.

Similarly, FIG. 1C illustrates an imaging range diagram of a line light source. As shown in FIG. 1C, the effective imaging range of a line light source is a runway-like annular area or a long elliptical annular area between the inner circle 21 and the outer circle 22, while the annular center 20 is an invalid imaging area, and a partial area (the shaded area) 23 inside the annular center 10 is a highlight area (afterimage area) which is easy to cause afterimage in the image sensor array during the imaging process.

At present, the display panels of display devices (such as mobile phones, etc.) using under-screen fingerprint identification are usually self-luminous display panels such as organic light-emitting display (OLED) panels. For non-self-luminous display panels such as liquid crystal display (LCD) panels that need to rely on the light emitted by backlight sources, due to the structural difference, the image sensor may not be able to fully receive the light reflected by the texture or the utilization rate of the light reflected by the texture is poor, and it is also easy to receive the stray light except the light reflected by the texture, which results in that it cannot obtain clear texture images and hence cannot enable the texture recognition.

At least one embodiment of the present disclosure provides a display panel. The display panel has a touch side, and includes an array substrate and an opposite substrate arranged opposite to each other. The array substrate includes an image sensor array, and the image sensor array includes a plurality of image sensors, and each of the plurality of image sensors includes a photosensitive element configured to receive light reflected by texture touched on the touch side for texture acquisition. The opposite substrate includes a light shielding layer, the light shielding layer includes a plurality of first openings arranged in an array; and in a direction perpendicular to a panel surface of the display panel, the plurality of first openings are in one-to-one correspondence with and at least partially overlap with the photosensitive elements of the plurality of image sensors. Therefore, the light reflected by the texture touched on the touch side can be respectively irradiated onto the photosensitive elements of the plurality of image sensors through the plurality of first openings, and the light passing through the plurality of first openings more tends to be vertically incident into the photosensitive elements of the plurality of image sensors, so as to improve the light utilization rate of the photosensitive elements of the plurality of image sensors. In addition, the light shielding layer can also prevent other stray light from entering the image sensor and affecting the texture acquisition of the image sensor.

At least one embodiment of the present disclosure also provides a display device, the display device includes the above-mentioned display panel and a backlight assembly, and the backlight assembly is arranged on the side of the array substrate away from the opposite substrate and configured to provide backlight for the display panel in operation. The backlight can be used for the display of the display panel, and can also be used as the photosensitive light source of the plurality of image sensors, thereby simplifying the structure of the display device.

The display panel and the display device provided by the embodiments of the present disclosure are explained by way of example through the following specific embodiments.

Figure 2:
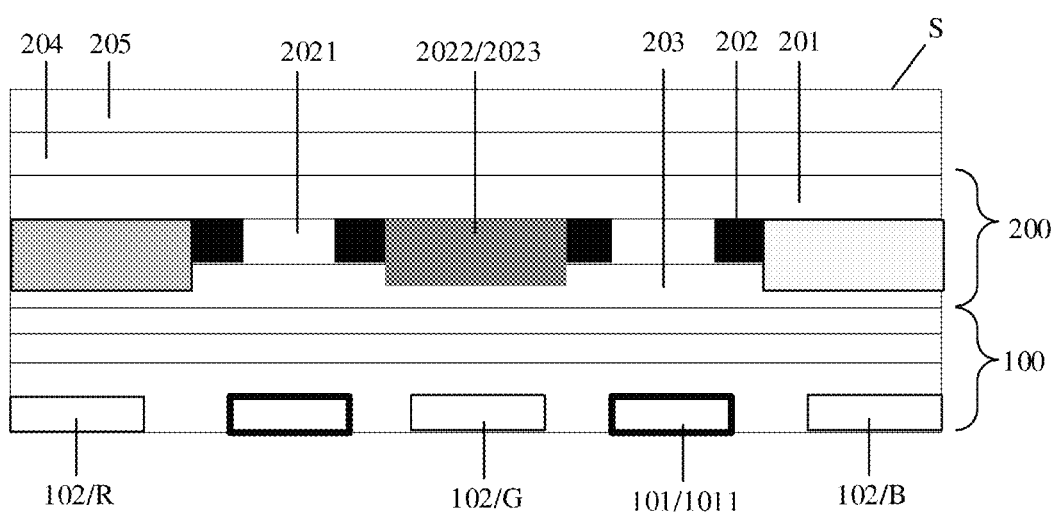
FIG. 2 is a schematic cross-sectional view of a display panel provided by at least one embodiment of the present disclosure.

At least one embodiment of the present disclosure provides a display panel, and FIG. 2 shows a schematic cross-sectional view of the display panel. As shown in FIG. 2, the display panel has a touch side S, and an operating body (such as a finger) with texture can touch the touch side S for texture acquisition and recognition. The display panel includes an array substrate 100 and an opposite substrate 200 which are arranged opposite to each other, and the array substrate 100 and the opposite substrate 200 are bonded to each other by a sealant arranged at the periphery. The array substrate 100 includes an image sensor array including a plurality of image sensors 101 arranged in an array in a predetermined area. Each image sensor 101 includes a photosensitive element 1011 which is configured to receive light reflected by the texture touched on the touch side S for texture acquisition. The opposite substrate 200 includes a light shielding layer 202 which includes a plurality of first openings 2021 arranged in an array. In the direction perpendicular to the panel surface of the display panel, that is, in the vertical direction in the figure, the plurality of first openings 2021 are in one-to-one correspondence with and are at least partially overlapped with the photosensitive elements 1011 of the plurality of image sensors 101, that is, the plurality of first openings 2021 respectively expose the photosensitive elements 1011 of the plurality of image sensors 101.

Therefore, the light reflected by the texture touched on the touch side can be respectively irradiated onto the photosensitive elements 1011 of the plurality of image sensors 101 through the plurality of first openings 2021, and the light passing through the plurality of first openings 2021 more tends to be vertically incident into the photosensitive elements 1011 of the plurality of image sensors 101, so as to improve the light utilization rate of the photosensitive elements 1011 of the plurality of image sensors 101. In addition, the light shielding layer 202 can also prevent other stray light from entering the photosensitive element 1011 of the image sensor 101 and affecting the texture acquisition of the image sensor 101.

For example, in some embodiments, as shown in FIG. 2, the array substrate 100 further includes a plurality of sub-pixels 102 arranged in an array, and the light shielding layer 202 further includes a plurality of second openings 2022 arranged in an array and a plurality of color filters 2023 respectively arranged in the plurality of second openings 2022; and in the direction perpendicular to the panel surface of the display panel, the plurality of color filters 2023 are in one-to-one correspondence with and are at least partially overlapped with the plurality of sub-pixels 102.

For example, in some examples, the plurality of sub-pixels 102 include a red sub-pixel R, a green sub-pixel G and a blue sub-pixel B, and the respective color filters 2023 corresponding to the red sub-pixel R, the green sub-pixel G and the blue sub-pixel B can respectively transmit red light, green light and blue light, thereby realizing the color display of the display panel.

Figure 3:
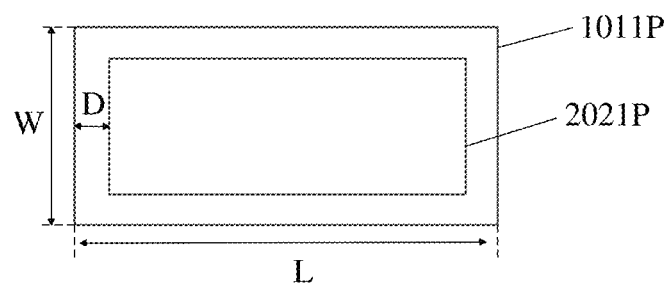
FIG. 3 is a schematic diagram of a photosensitive element corresponding to a first opening in a display panel provided by at least one embodiment of the present disclosure.

For example, in some embodiments, as shown in FIG. 3, for one first opening 2021 and one image sensor 101 that are correspondingly arranged, the orthographic projection 2021P of the first opening 2021 on the panel surface of the display panel is inside the orthographic projection 1011P of the photosensitive element 1011 of the image sensor 101 on the panel surface of the display panel. That is, the planer size of the first opening 2021 is not larger than the planer size of the photosensitive element 1011 of the image sensor 101. Therefore, the light passing through the first opening 2021 can be fully irradiated onto the image sensor 101, and can be prevented from being irradiated onto other driving circuits in the array substrate, so as to avoid affecting the normal operation of other driving circuits.

For example, in some embodiments, for one first opening 2021 and one image sensor 101 that are correspondingly arranged, the distance D between the edge of the orthographic projection 2021P of the first opening 2021 on the panel surface of the display panel and the edge of the orthographic projection 1011P of the photosensitive element 1011 of the image sensor 101 on the panel surface of the display panel is 0-5 μm, such as 2 μm, 3 μm or 4 μm, etc. That is, the planer shape of the first opening 2021 is retracted by 0 μm-5 μm, for example, 2 μm-4 μm, with relative to the planer shape of the photosensitive element 1011 of the image sensor 101, so that a certain distance of alignment space is reserved, which avoids any offset resulted by a misalignment between the first opening 2021 and the photosensitive element 1011 of the image sensor 101 during the manufacturing process.

For example, in some embodiments, as shown in FIG. 3, the planar shape of the plurality of first openings 2021 may be square or rectangular, and at this time, the length Lx width W of this planar shape may be 10 μm×10 μm-50 μm×50 μm, such as 20 μm×30 μm, 24 μm×24 μm, 24 μm×40 μm, or 28 μm×40 μm. For example, the plurality of first openings 2021 have the same planer shape as the photosensitive elements 1011 of the plurality of image sensors 101, both square or rectangular. At this time, the photosensitive elements 1011 of the plurality of image sensors 101 have sufficient photosensitive areas, and the plurality of first openings 2021 can fully transmit the light reflected by the texture, so as to meet the requirements of texture recognition.

For example, in some other embodiments, according to the arrangement of various structures on the array substrate 100, the planar shapes of the first openings 2021 and the photosensitive elements 1011 of the plurality of image sensors 101 may also be other shapes, such as oval, pentagon, hexagon or other irregular patterns, and the embodiments of the present disclosure are not particularly limited here.

Figure 4:
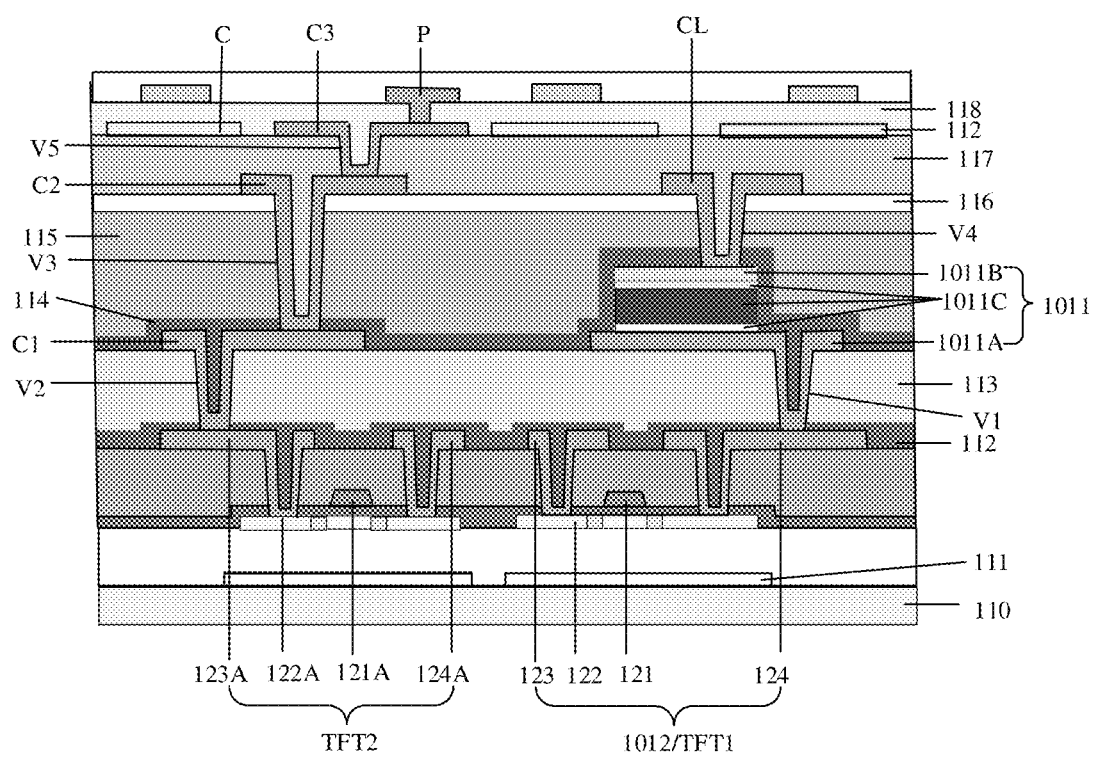
FIG. 4 is a schematic cross-sectional view of an array substrate of a display panel provided by at least one embodiment of the present disclosure.

For example, FIG. 4 shows a schematic cross-sectional view of an array substrate 100. As shown in FIG. 4, each image sensor 101 includes a photosensitive element 1011 and at least one switching element 1012. The photosensitive element 1011 includes a first electrode 1011A, a second electrode 1011B, and a semiconductor layer 1011C between the first electrode 1011A and the second electrode 1011B. The first electrode 1011A is electrically connected to the switching element 1012 through a first via hole V1, and the semiconductor layer 1011C partially overlaps or has no overlap with the first via hole V1 in the direction perpendicular to the panel surface of the display panel, that is, the vertical direction in the figure which shows the case of no overlap. Because the first electrode 1011A at the position of the first via hole V1 is not flat, if the semiconductor layer 1011C is formed at an uneven position, it is easy to cause the semiconductor layer 1011C to be uneven, which leads to the instability of the semiconductor layer 1011C. In operation, the dark state current is large, the noise rises, and finally the signal-to-noise ratio of the acquired texture decreases.

For example, the photosensitive element 1011 may be a photodiode, which may be of PN type or PIN type, etc. When the photodiode is of PN type, the semiconductor layer 1011C includes a P-type semiconductor layer and an N-type semiconductor layer that are stacked; when the photodiode is of PIN type, the semiconductor layer 1011C includes a P-type semiconductor layer, an intrinsic semiconductor layer and an N-type semiconductor layer that are stacked. For example, the semiconductor material used in the semiconductor layer 1011C may be silicon, germanium, selenium, gallium arsenide, etc., and the embodiments of the present disclosure are not limited to this.

For example, in some embodiments, as shown in FIG. 4, the array substrate further includes a base substrate 110 and a first planarization layer 113, at least one switching element 1012 is arranged on the base substrate 110, and the at least one switching element 1012 includes a switching transistor TFT1 which includes an active layer 122, a gate electrode 121, and source-drain electrodes 123 and 124. The first planarization layer 113 is arranged at the side of the switching transistor TFT1 away from the base substrate 110 to provide a flat surface, and the first electrode 1011A is arranged at the side of the planarization layer 113 away from the base substrate 110. The first planarization layer 113 has the above-mentioned first via hole V1, and the first electrode 1011A is electrically connected with the source-drain electrode 124 through the first via hole V1. Therefore, the first planarization layer 113 provides a flat surface, and the first electrode 1011A is arranged on the flat surface, so that the semiconductor layer 1011C on the first electrode 1011A is relatively flat, which avoids problems such as instability of the semiconductor layer 1011C.

For example, as shown in FIG. 4, each of the plurality of sub-pixels includes a pixel driving circuit arranged on the base substrate 110, and the pixel driving circuit includes a thin film transistor TFT2 which is arranged in the same layer as the switching transistor TFT1. For example, the same functional layers of the thin film transistor TFT2 and the switching transistor TFT1 are all arranged in the same layer. For example, the TFT2 includes an active layer 122A, a gate electrode 121A, and source-drain electrodes 123A and 124A, in which the active layer 122A is arranged in the same layer as the active layer 122, the gate electrode 121A is arranged in the same layer as the gate electrode 121, and the source-drain electrodes 123A and 124A are arranged in the same layer as the source-drain electrodes 123 and 124, thereby simplifying the manufacturing process of the display panel.

It should be noted that, in the embodiment of the present disclosure, "be arranged in the same layer" means that two functional layers or structural layers are in the same layer and formed of the same material in the hierarchical structure of the display substrate, that is, in the manufacturing process, the two functional layers or structural layers can be formed of the same material layer, and the required patterns and structures can be formed by the same patterning process.

For example, in some embodiments, as shown in FIG. 4, the array substrate 100 further includes a first connection electrode C1, a second planarization layer 115, a second connection electrode C2, and a connection trace CL. The first planarization layer 113 further has a second via hole V2, and the first connection electrode C1 is electrically connected to the source-drain electrode 123A of the thin film transistor TFT2 through the second via hole V2, and the first connection electrode C1 and the first electrode 1011A are arranged in the same layer. The semiconductor layer 1011C and the second electrode 1011B are sequentially arranged on the first electrode 1011A, and the second planarization layer 115 is arranged at the side of the first connection electrode C1 and the second electrode 1011B away from the base substrate 110. The second planarization layer 115 has a third via hole V3 and a fourth via hole V4, the second connection electrode C2 is electrically connected with the first connection electrode C1 through the third via hole V3, the connection trace CL is electrically connected with the second electrode 1011B through the fourth via hole V4, and the connection trace CL and the second connection electrode C2 are arranged in the same layer.

For example, in some embodiments, as shown in FIG. 4, the array substrate 100 further includes a third planarization layer 117 and a pixel electrode 7. The third planarization layer 117 is arranged at the side of the second connection electrode C2 and the connection trace CL away from the base substrate 110, and the third planarization layer 117 has a fifth via hole V5 through which the pixel electrode P is electrically connected with the second connection electrode C2. For example, in some examples, the array substrate 100 may further include a third connection electrode C3 which is electrically connected to the second connection electrode C2 through a fifth via hole V5. An insulating layer 118 is provided at the side of the third connection electrode C3 away from the base substrate 110, and a sixth via hole is provided in the insulating layer 118. The pixel electrode P is electrically connected to the third connection electrode C3 through the sixth via hole, and hence is electrically connected to the second connection electrode C2. Thereby, the thin film transistor TFT2 is electrically connected to the pixel electrode 7, and the voltage of the pixel electrode 7 can be controlled.

For example, in some embodiments, the display panel further includes a common electrode C. For example, as shown in FIG. 4, the common electrode C is arranged on the array substrate 100 and is insulated from the pixel electrode P through the insulating layer 118, thereby forming a display panel driven by fringe field switching (FFS). For example, as shown in FIG. 4, the common electrode C may be arranged in the same layer as the third connection electrode C3.

For example, in some other embodiments, the common electrode C may be arranged in the same layer as the pixel electrode P and are spaced apart from the pixel electrode P, thereby forming a display panel driven by in-plane electric field switching (IPS); alternatively, the common electrode C may be arranged on the opposite substrate 200, thereby forming a display panel driven by a vertical electric field. For example, the common electrode C and the pixel electrode P are made of transparent metal oxides such as indium tin oxide (ITO), indium zinc oxide (IZO) and gallium zinc oxide (GZO). The embodiments of the present disclosure are not limited to the specific arrangement and materials of the common electrode C and the pixel electrode P.

For example, in some embodiments, the array substrate may further include insulating layers such as passivation layers 112, 114 and 116 to protect the conductive layers in the array substrate. For example, the passivation layers 112, 114, and 116 are made of inorganic insulating materials, such as silicon oxide, silicon nitride, or silicon oxynitride, and the first planarization layer 113, the second planarization layer 115, and the third planarization layer 117 may be made of organic insulating materials such as polyimide and resin.

For example, each of the active layers may be an amorphous silicon layer, a polysilicon layer or a metal oxide semiconductor layer. For example, the polysilicon can be high-temperature polysilicon or low-temperature polysilicon, and the oxide semiconductor can be indium gallium zinc oxide (IGZO), indium zinc oxide (IZO), zinc oxide (ZnO) or gallium zinc oxide (GZO), etc. The gate electrode, the source-drain electrode can be made of metal materials or alloy materials such as copper (Cu), aluminum (Al) and titanium (Ti), for example, and can be formed into a single-layered metal layer structure or a multi-layered metal layer structure such as titanium/aluminum/titanium. The connection electrodes and connection traces can be made of metal materials or alloy materials such as copper (Cu), aluminum (Al), titanium (Ti). The first electrode 1011A may be made of metal material or alloy material such as copper (Cu), aluminum (Al) and titanium (Ti), and the second electrode 1011B may be made of transparent metal oxide such as indium tin oxide (ITO), indium zinc oxide (IZO) and gallium zinc oxide (GZO). The materials of the functional layers are not specifically limited in the embodiments of the present disclosure.

Figure 5:
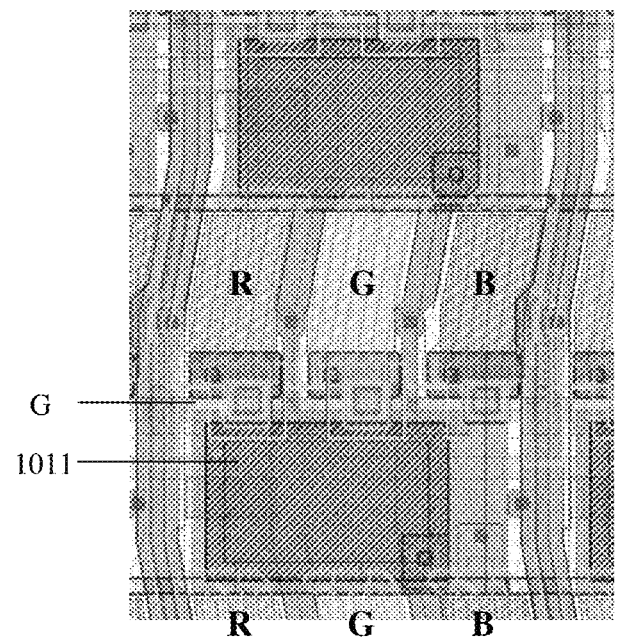
FIG. 5 is a partial plan view of an array substrate of a display panel provided by at least one embodiment of the present disclosure.

For example, FIG. 5 shows a schematic plan view of an array substrate. In some embodiments, as shown in FIG. 5, the plurality of sub-pixels (shown as R, G, B sub-pixels) are arranged in an array of multiple rows and columns, and the display panel further includes a ng extending between two adjacent rows of sub-pixels, and the scanning line G is used to provide a scanning signal for the plurality of sub-pixels. For example, at least some of the plurality of image sensors are arranged between two adjacent rows of sub-pixels, for example, each of the plurality of image sensors 101 may be arranged between two adjacent rows of sub-pixels, and the extending direction of the photosensitive elements 1011 of at least some of the plurality of image sensors 101 is the same as the extending direction of the scanning line G. Because the distance between adjacent two rows of sub-pixels is often larger than the distance between adjacent two columns of sub-pixel units, the image sensor 101 can be arranged between adjacent two rows of sub-pixels for the convenience of device layout; and after an anti-peeping film is provided for the display panel (described in details later) in the subsequent process, the extending direction of the photosensitive element 1011 is the same as the extending direction of the scanning line G and hence is perpendicular to the anti-peeping direction of the anti-peeping film, so as to prevent from the crosstalk of light in the extending direction of the photosensitive element 1011, thereby improving the operation quality of the photosensitive element 1011.

For example, in some embodiments, at least some of the plurality of image sensors have no overlap with the scanning line G in the direction perpendicular to the panel surface of the display panel. Therefore, the photosensitive element 1011 is at a certain distance from the scanning line G to avoid signal crosstalk.

Figure 6:
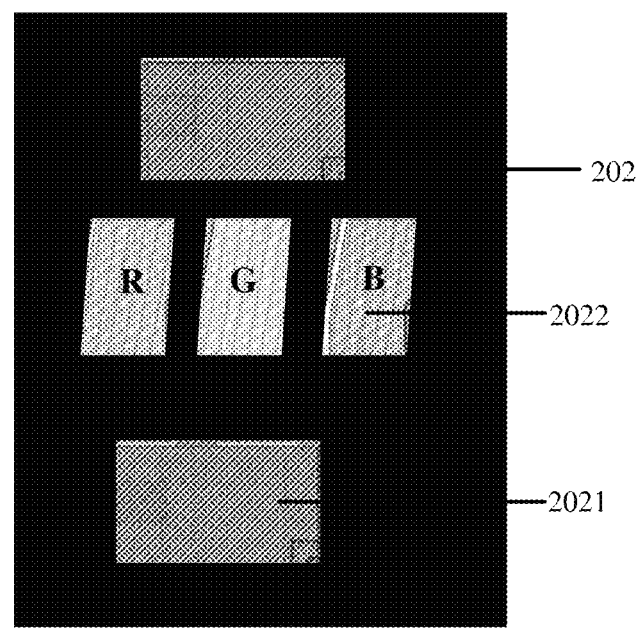
FIG. 6 is a schematic diagram of a corresponding arrangement of an array substrate and a light shielding layer in a display panel provided by at least one embodiment of the present disclosure.

For example, FIG. 6 shows a schematic plan view of the array substrate in FIG. 5 after the light shielding layer 202 is superimposed. As shown in FIG. 6, the light shielding layer 202 includes a plurality of first openings 2021 respectively exposing a plurality of photosensitive elements 1011 and a plurality of second openings 2022 respectively exposing a plurality of sub-pixels R, G, B, thereby enabling the display panel to perform display and texture recognition at the same time.

Hereafter, the specific structure and working process of the image sensor 101 will be described by way of example with reference to the drawings.

Figure 7:
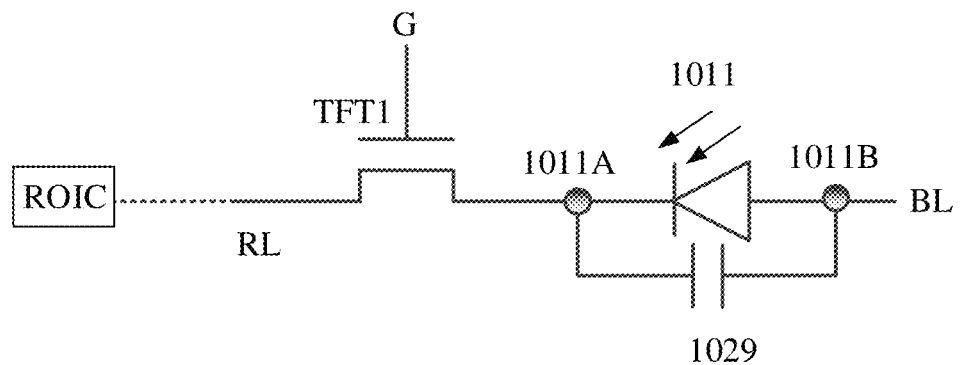
FIG. 7 is a schematic diagram of a structure and a connection relationship of an image sensor in a display panel provided by at least one embodiment of the present disclosure.

For example, FIG. 7 shows the structure and circuit connection of an exemplary image sensor. As shown in FIG. 7, each image sensor 101 includes a photosensitive element 1011 and a switching transistor TFT1. In some examples, the image sensor 101 may further include a capacitor 1029. The second electrode 1011B of the photosensitive element 1011 is connected to a bias line BL, the first electrode 1011A of the photosensitive element 1011 is connected to one source-drain electrode of the switching transistor TFT1, the other source-drain electrode of the switching transistor TFT1 is connected to a signal readout line RL, the control electrode G of the switching transistor TFT1 is connected to the scanning signal for the image sensor array, and the signal readout line RL is connected to a readout integrated circuit ROIC. The first electrode of the capacitor 1029 is electrically connected to the second electrode 1011B of the photosensitive element 1011, and the second electrode of the capacitor 1029 is electrically connected to the first electrode 1011A of the photosensitive element 1011.

The working process of the above exemplary image sensor including the capacitor 1029 includes: in a reset stage, the switching transistor TFT1 is turned on by inputting a scanning signal to the control electrode G, and the ROIC writes a reset signal to the capacitor 1029 via the TFT1 to reset the capacitor 1029 and also reset the photosensitive element 1011; in a photosensitive stage, the switching transistor TFT1 is turned off, the photosensitive element 1011 is in a negative bias state, and the photosensitive element 1011 generates photo-generated carriers and charges the capacitor 1029 under the irradiation of reflected light so that the capacitor 1029 generates and stores electrical signals; in a detection stage, the switching transistor TFT1 is turned on, and the ROIC reads the electric signal stored in the capacitor 1029 through the TFT1, and then a texture image is formed.

Figure 8:
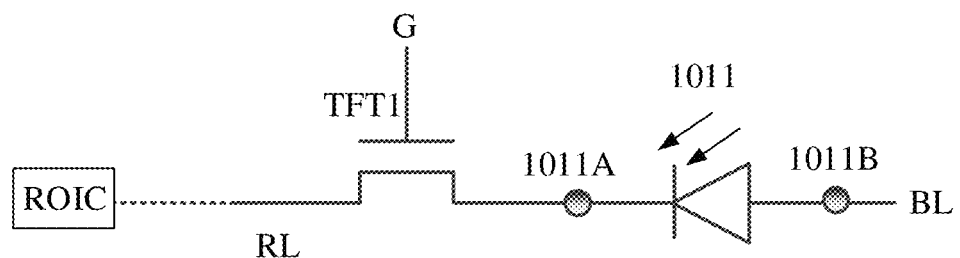
FIG. 8 is a schematic diagram of a structure and a connection relationship of another image sensor in the display panel provided by at least one embodiment of the present disclosure.

FIG. 8 shows the structure and circuit connection of another exemplary image sensor which does not include a capacitor. The working process of the exemplary image sensor without a capacitor includes: in the reset stage, the switching transistor TFT1 is turned on by inputting a scanning signal to the control electrode G, and the ROIC writes a reset signal to the first electrode 1011A of the photosensitive element 1011 via the switching transistor TFT1, so that the photosensitive element 1011 is reset; in the photosensitive stage, the switching transistor TFT1 is turned off, the photosensitive element 1011 is in a negative bias state, and the photosensitive element 1011 generates photo-generated carriers to generate photo-generated leakage current under the irradiation of reflected light; in the detection stage, the switching transistor TFT1 is turned on, and the ROIC reads the electrical signal corresponding to the photo-generated leakage current through TFT1, and then a texture image is formed.

Figure 9:
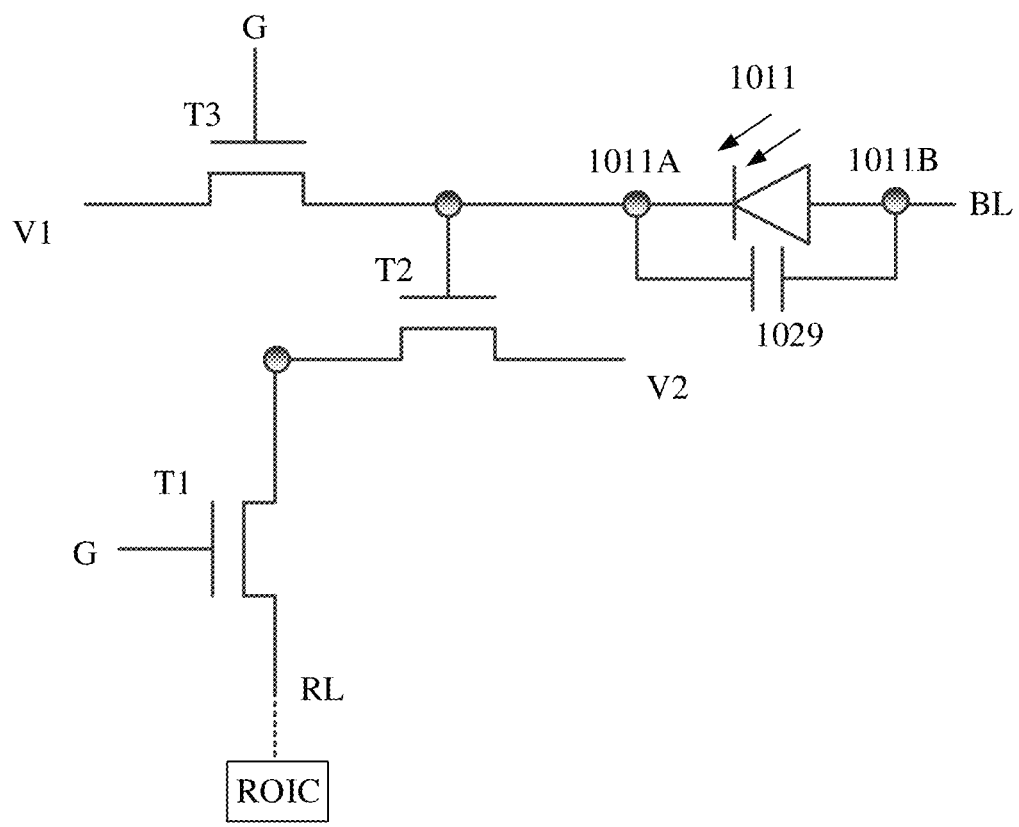
FIG. 9 is a schematic diagram of a structure and a connection relationship of yet another image sensor in the display panel provided by at least one embodiment of the present disclosure.

FIG. 9 shows the structure and circuit connection of yet another exemplary image sensor which includes a photosensitive element 1011, a capacitor 1029, a first switching transistor TFT1, a second switching transistor TFT2, and a third switching transistor TFT3. The working process of the exemplary image sensor including three switching transistors includes: in the reset stage, the third switching transistor TFT3 is turned on by inputting a reset signal to the control electrode G of the third switching transistor TFT3 (as a reset transistor), and the reset signal is written into the first electrode 1011A of the photosensitive element 1011 and the control terminal of the second switching transistor TFT2 (as a driving transistor); in the photosensitive stage, the photosensitive element 1011 generates photo-generated carriers and photo-generated leakage current under the irradiation of reflected light, and charges the capacitor 1029, so that the capacitor 1029 generates and stores an electrical signal; in the detection stage, the first switching transistor TFT1 is turned on, and the ROIC reads the electric signal stored in the capacitor 1029 through the first switching transistor TFT1 and the second switching transistor TFT2, and then a texture image is formed.

For example, for an image sensor with three switching transistors, only one switching transistor is shown in FIG. 4, and the source-drain electrode of the third switching transistor is shown to be electrically connected with the first electrode 1011A in FIG. 4; that is, the first electrode 1011A is electrically connected with the source-drain electrode of the third switching transistor through the first via hole V1. As shown in FIG. 9, the other source-drain electrode of the third switching transistor is electrically connected with the power supply voltage line V1, the first electrode 1011A is also electrically connected to the gate electrode of the second switching transistor T2, one source-drain electrode of the second switching transistor T2 is electrically connected to one source-drain electrode of the first switching transistor T1, the other source-drain electrode of the second switching transistor T2 is electrically connected to the power supply voltage line V2, and the other source-drain electrode of the first switching transistor T1 is electrically connected to the signal readout line RL. In this way, the above working process is realized.

Figure 10:
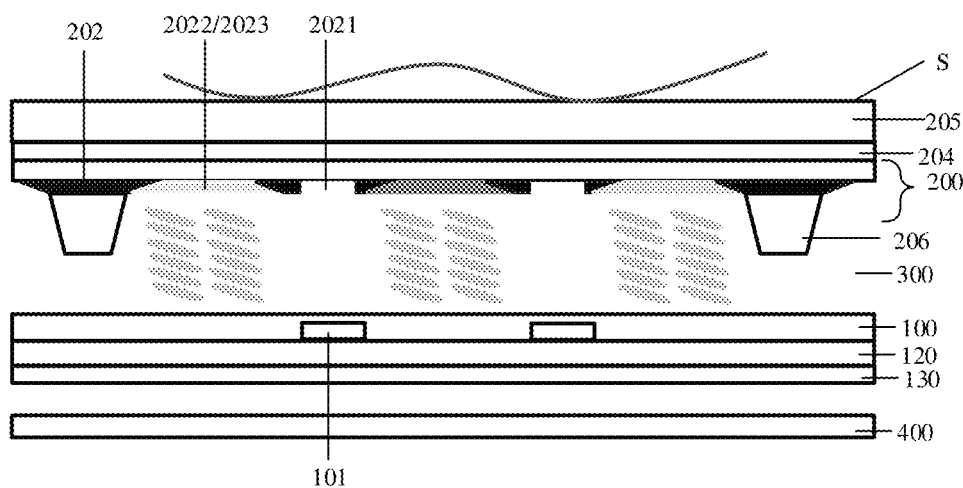
FIG. 10 is a schematic cross-sectional view of a display device provided by at least one embodiment of the present disclosure.

For example, in some embodiments, the display panel may be a liquid crystal display panel. In such case, as shown in FIG. 10, the display panel further includes a liquid crystal layer 300 between the array substrate 100 and the opposite substrate 200 which are bonded to each other by a sealant provided at the periphery to form a liquid crystal cell receiving the liquid crystal layer 300; furthermore, the array substrate 100 includes a first polarizer which is, for example, arranged at the light incident side of the display light of the array substrate; the opposite substrate 200 includes a second polarizer which is, for example, arranged at the light exiting side of the display light of the opposite substrate. For example, the polarization axis of the first polarizer and the polarization axis of the second polarizer are perpendicular to each other, so that the liquid crystal layer 300 can control the light transmission degree of the corresponding area with the cooperation of the first polarizer and the second polarizer. For example, for the gray scale range of 0-255, it can realize 0 gray scale which is basically opaque or 255 gray scale which has the maximum light transmission degree.

Figure 11:
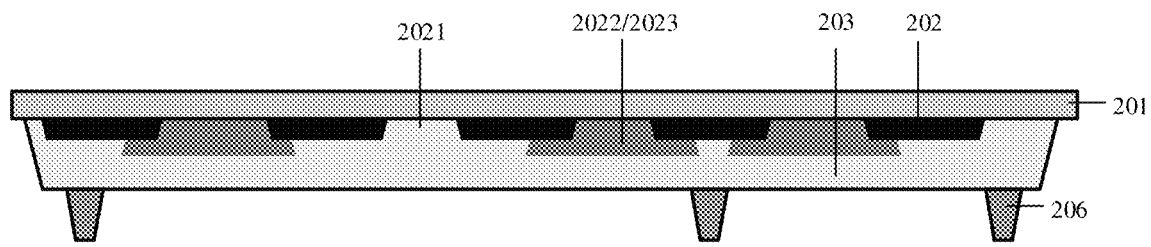
FIG. 11 is a schematic cross-sectional view of an opposite substrate of the display panel provided by at least one embodiment of the present disclosure.

For example, FIG. 11 shows a schematic cross-sectional view of an opposite substrate 200. As shown in FIGS. 10 and 11, the opposite substrate 200 includes a base substrate 201, and a light shielding layer 202 and a protective layer 203 (such as a resin layer) which are arranged on the base substrate 201. For example, the opposite substrate 200 also includes a spacer 206 arranged at the side of the opposite substrate 200 facing the array substrate 100, so as to form a certain space for receiving liquid crystal materials between the array substrate 100 and the opposite substrate 200 and also to maintain the distance between the array substrate 100 and the opposite substrate 200.

Figure 12:
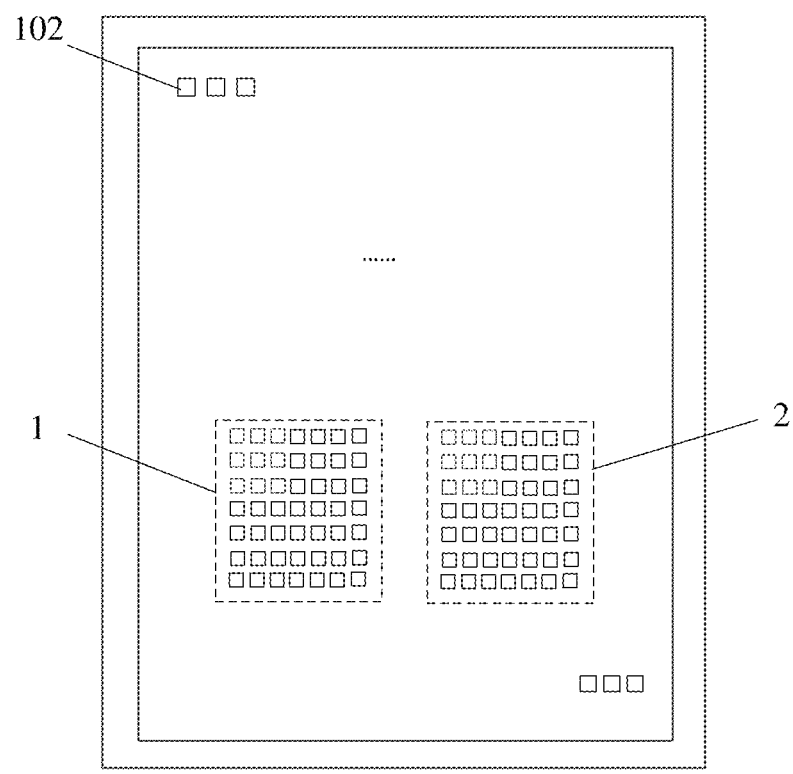
FIG. 12 is a schematic diagram of a first area and a second area for providing light transmission of a display panel provided by at least one embodiment of the present disclosure.

For example, FIG. 12 shows a schematic plan view of a display panel provided by at least one embodiment of the present disclosure. As shown in FIG. 12, in the process of texture acquisition of the display panel, the liquid crystal layer 300 is configured to respond to a control signal so that the first area 1 is in a transparent state. For example, the first area 1 includes a pixel area corresponding to at least one sub-pixel 102. For example, the above control signal includes a scanning signal and a data signal, and each sub-pixel 101 is configured to control the light-transmitting state in the pixel area corresponding to the sub-pixel 102 according to the scanning signal and data signal.

Figure 13A:
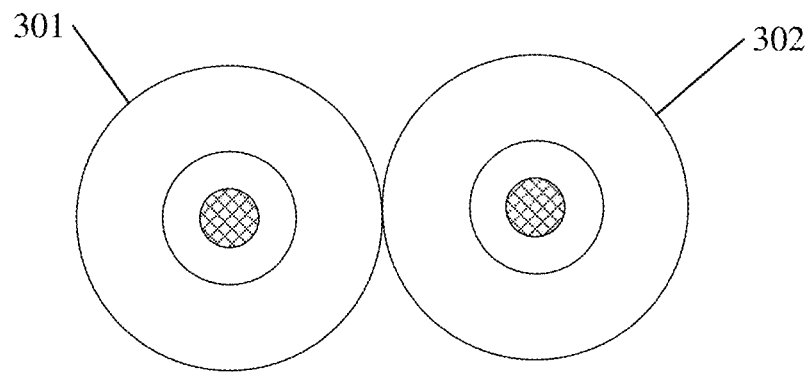
FIGS. 13A and 13B are schematic diagrams of an imaging range of a photosensitive light source formed through the light-transmitting areas of the display panel in FIG. 12.

For example, as shown in FIG. 10, the side of the liquid crystal layer 300 away from the opposite substrate 200 has a backlight assembly 400 (described in detail later), and the light emitted by the backlight assembly 400 can pass through the first area 1 to form the first photosensitive light source of the image sensor array. For example, as shown in FIG. 13A, the first imaging range of the first photosensitive light source on the image sensor array is presented as a first annular shape 301 which can be used for texture imaging.

In some embodiments, the imaging range formed by one photosensitive light source is often limited. When the texture has a large area, the imaging range formed by one photosensitive light source may not be enough to meet the needs of texture recognition. In such case, a plurality of photosensitive light sources can be turned on in a time-sharing manner to form a plurality of effective imaging ranges, and these effective imaging ranges can be superimposed and spliced to obtain a larger texture image.

For example, in some embodiments, as shown in FIG. 12, the display panel is further configured to control the liquid crystal layer 300 to respond to the control signal so that the second area 2 different from the first area 1 is in a light-transmitting state, so that the light emitted by the light source array is allowed to pass through the second area 2 in the light-transmitting state, and then a second photosensitive light source is formed. Furthermore, the first area 1 and the second area 2 may be in a light-transmitting state at the same time or at different times; the number of the sub-pixels 102 corresponding to the first area 1 and the second area 2 may be the same or different.

For example, in some examples, the display panel is further configured to control the liquid crystal layer 300 so that the first area 1 and the second area 2 are in a light-transmitting state at a first time, and the number of the sub-pixels 102 corresponding to the first area 1 and the second area 2 is the same, for example, both corresponding to 7×7 sub-pixels or 8×8 sub-pixels arranged in an array. In such case, as shown in FIG. 13A, the first imaging range of the first photosensitive light source formed by light passing through the first area 1 on the image sensor array is presented as a first annular shape 301, and the second imaging range of the second photosensitive light source formed by light passing through the second area 2 on the image sensor array is presented as a second annular shape 302. The first annular shape 301 is tangent to the second annular shape 302, and the first annular shape 301 and the second annular shape 302 can be used for texture imaging, together.

Figure 13B:
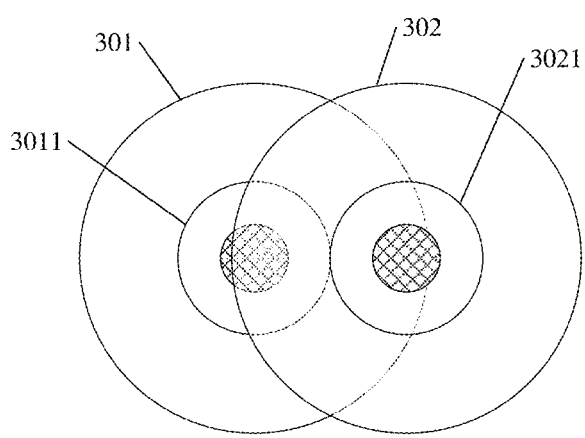

For example, in some examples, the display panel is further configured to control the liquid crystal layer 300 so that the first area 1 is in a light-transmitting state at a first time and the second area 2 is in a light-transmitting state at a second time different from the first time, and the number of the sub-pixels 102 corresponding to the first area 1 and the second area 2 is the same, for example, both corresponding to 7×7 sub-pixels or 8×8 sub-pixels arranged in an array, etc. In such case, as shown in FIG. 13B, the first imaging range of the first photosensitive light source formed by light passing through the first area 1 on the image sensor array is presented as a first annular shape 301, and the second imaging range of the second photosensitive light source formed by light passing through the second area 2 on the image sensor array is presented as a second annular shape 302, the second annular shape 302 at least partially covers the central part 3011 of the first annular shape 301, while the first annular shape 301 at least partially covers the central part 3021 of the second annular shape 302. Therefore, the first annular shape 301 and the second annular shape 302 can be complemented with each other, so as to be used for texture imaging together.

Figure 14:
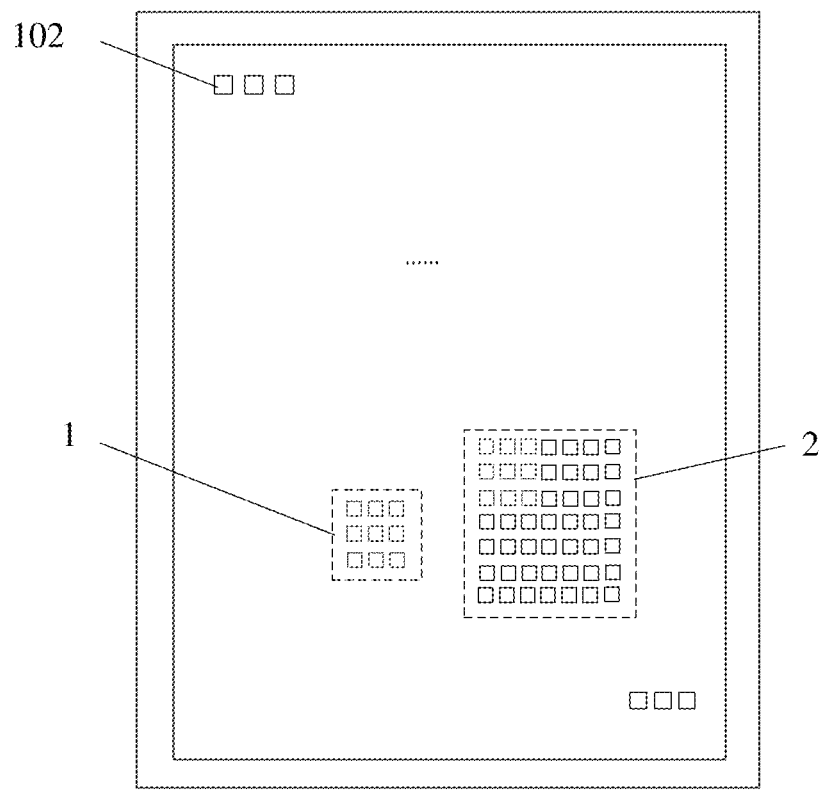
FIG. 14 is another schematic diagram of the first area and the second area for providing light transmission of the display panel provided in at least one embodiment of the present disclosure.
Figure 15:
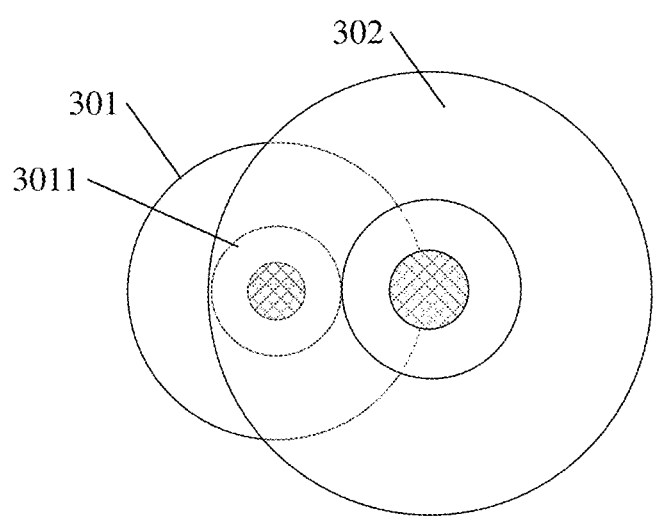
FIG. 15 is a schematic diagram of an imaging range of a photosensitive light source formed through the light-transmitting areas of the display panel in FIG. 14.

For example, in some examples, as shown in FIG. 14, the display panel is further configured to control the liquid crystal layer 300 so that the first area 1 is in a light-transmitting state at a first time and the second area 2 is in a light-transmitting state at a second time different from the first time, and the number of the sub-pixels 102 corresponding to the first area 1 and the second area 2 is different, for example, the first area 1 corresponds to 2×2 sub-pixels or 3×3 sub-pixels arranged in an array, etc., while the second area 2 corresponds to 7×7 sub-pixels or 8×8 sub-pixels arranged in an array, etc. In such case, the size of the second area 2 is larger than that of the first area 1. As shown in FIG. 15, the first imaging range of the first photosensitive light source formed by light passing through the first area 1 on the image sensor array is presented as a first annular shape 301, and the second imaging range of the second photosensitive light source 202 formed by light passing through the second area 2 on the image sensor array is presented as a second annular shape 302 which at least partially covers (fully covering, as shown in the figure) the first annular shape 301. Therefore, the imaging range of the second photosensitive light source 202 can supplement the invalid imaging area of the first annular shape 301 (i.e., the central part 3011), so that the effective imaging ranges of the first photosensitive light source and the second photosensitive light source are superimposed and spliced to obtain a larger imaging range.

For example, in some examples, in order to further expand the imaging range, the display panel is further configured to control the liquid crystal layer 300 so as to control the third area different from the first area 1 and the second area 2 to be in a light-transmitting state, so that the light emitted by the light source array is allowed to pass through the third area in the light-transmitting state to form a third photosensitive light source; alternatively, a plurality of first areas 1 arranged in an array is allowed to be in a light-transmitting state at a first time, and a plurality of second areas 2 arranged in an array is allowed to be in a light-transmitting state at the first time or at a second time different from the first time, so as to form a plurality of photosensitive light sources arranged in an array which is used for texture imaging, together, thereby obtaining a larger imaging range.

It should be noted that the display panel may include a cover plate 205 and other structures in addition to the above structures.

For example, as shown in FIG. 10, the cover plate 205 can be a glass cover plate to encapsulate and protect the display panel. For example, the surface of the cover plate 205 forms the touch side S. The array substrate 100 is provided with a first polarizer 130, and the first polarizer 130 is bonded to the array substrate 100 by an adhesive layer 120 (such as optical transparent glue); the opposite substrate 200 is provided with a second polarizer 204, and the second polarizer 204 is bonded to the opposite substrate 200 by an adhesive layer (not shown). The polarization directions of the first polarizer 130 and the second polarizer 204 are perpendicular to each other. The liquid crystal molecules of the liquid crystal layer 300 are driven to be deflected by the electric field, and the transmittance of light is controlled by the cooperation of the first polarizer 130 and the second polarizer 204, so as to realize gray scale display. For example, the display panel also includes a driving circuit for driving each pixel unit, signal lines (including gate lines, data lines, detection lines, etc.) for providing electrical signals (including scanning signals, data signals, detection signals, etc.), and a driving circuit connecting the image sensors 101. For example, in some embodiments, the display panel further includes a touch structure, which is used for a touch operation of the display panel, and further used for obtaining the touch position and touch area of the texture on the touch side S, and then used for selecting the position and size of the first area 1. Other structures of the display panel are not particularly limited in the embodiments of the present disclosure.

It should be noted that the above embodiments are described with reference to the case where the photosensitive light source is a point light source by way of example. In some other embodiments, the photosensitive light source may also be a line light source or other patterned light sources without particularly limited in the embodiments of the present disclosure. In addition, the point-shaped photosensitive light source can be obtained by adjusting the shapes of the light-transmitting areas (the first area 1, the second area 2, etc.), for example, the light-transmitting areas can be approximately square or circular, and in some cases, the light-transmitting areas can be formed into irregular patterns, which are not specifically limited in the embodiments of the present disclosure.

At least one embodiment of the present disclosure provides a display device. As shown in FIG. 10, the display device includes any of the above-mentioned display panels and a backlight assembly 400. The backlight assembly 400 is arranged at the side of the array substrate 100 away from the opposite substrate 200 and is configured to provide backlight for the display panel in operation, for example, to provide a photosensitive light source for an image sensor array.

For example, when an operating body with texture, e.g., a finger, touches the touch side S of the display panel, the light emitted by the backlight assembly 400 can be reflected by the operating body to reach the image sensor 101, then the image sensor 101 can acquire the texture image of the operating body. For example, the operating body with texture can be a hand, and the texture recognized by the image sensor 102 is skin texture, such as fingerprints, palmprint, etc. In addition, the operating body with texture can also be a non-biological body with a certain texture, such as an object with a certain texture made of resin and other materials, which is not particularly limited in the embodiments of the present disclosure.

Figure 16:
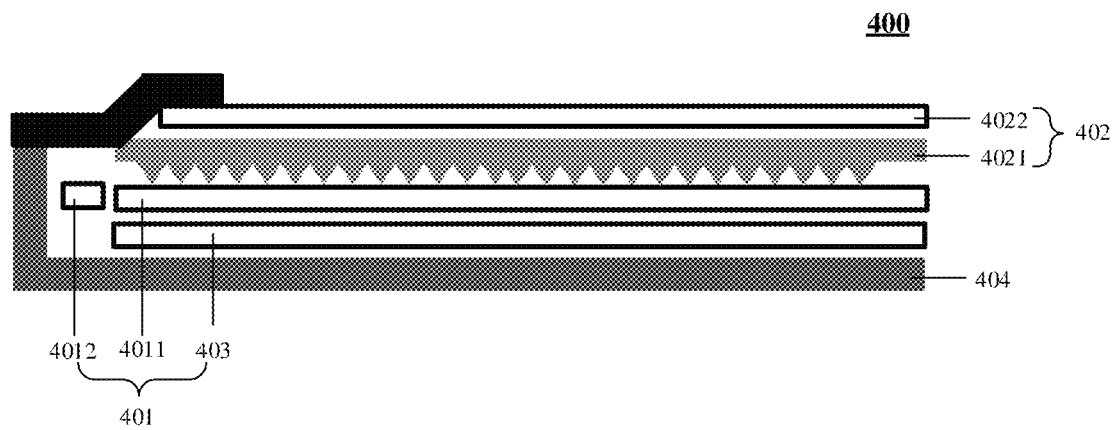
FIG. 16 is a schematic cross-sectional view of a backlight assembly of a display device provided by at least one embodiment of the present disclosure.

For example, FIG. 16 shows a schematic cross-sectional view of a backlight assembly 400. As shown in FIG. 16, the backlight assembly 400 includes a surface light source 401 and a light constraining layer 402. The light constraining layer 402 is located at the side of the surface light source 401 close to the display panel, and the light constraining layer 402 is configured to constrain the light emitted by the surface light source 401 in the direction perpendicular to the panel surface of the display panel. Therefore, when the backlight assembly 400 provides the photosensitive light source for the image sensor array, the light-emitting direction of the photosensitive light source is collimated, so that the light reflected by the texture has certain collimation, thus preventing from the crosstalk between the light reflected by the texture, and further avoiding the influence on the texture acquisition and identification of the image sensor array.

Figure 17:
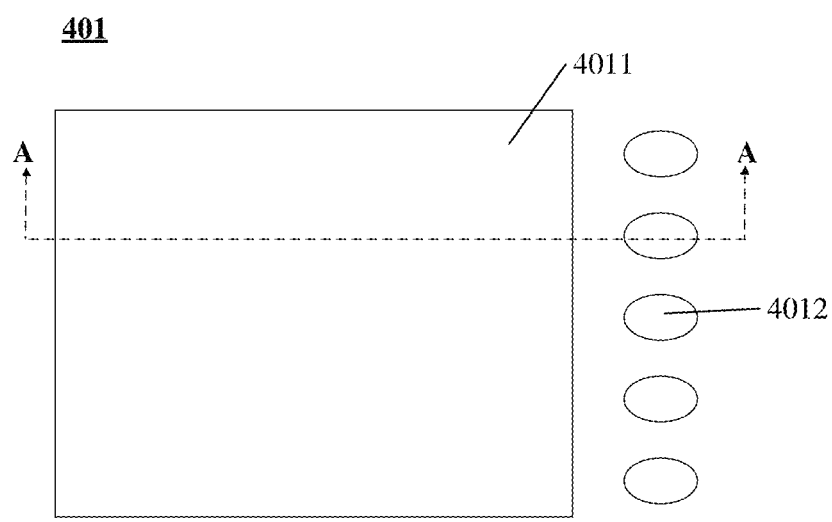
FIG. 17 is a schematic plan view of a surface light source of a backlight assembly of a display device provided by at least one embodiment of the present disclosure.
Figure 18:
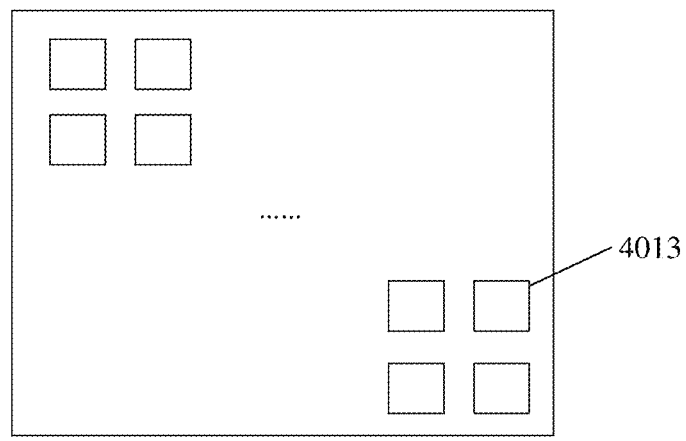
FIG. 18 is another schematic plan view of a surface light source of a backlight assembly of a display device provided in at least one embodiment of the present disclosure.

For example, FIG. 17 shows a schematic plan view of a surface light source 401, and the cross section of the surface light source 401 in FIG. 16 can be taken along the line A-A in FIG. 17. As shown in FIG. 17, the surface light source 401 includes a light guide plate 4011 and at least one light-emitting element 4012 (for example, a plurality of light-emitting elements 4012) arranged at at least one side of the light guide plate. The light emitted by the at least one light-emitting element 4012 is incident onto the light guide plate 4011 from at least one side, and exits from the plate surface of the light guide plate 4011 facing the light constraining layer 402. Alternatively, in some other embodiments, as shown in FIG. 18, the surface light source 401 includes a light-emitting element array including a plurality of light-emitting elements 4013 arranged in multiple rows and multiple columns in a plane parallel to the display panel.

For example, the light constraining layer 402 includes an inverse prism 4021 and an anti-peeping film 4022. The inverse prism 4021 is arranged at one side of the anti-peeping film 4022 close to the surface light source 401, and the inverse prism 4021 is configured to collimate the light emitted from the surface light source 401 in a direction perpendicular to the surface of the display panel by means of refraction effects. The anti-peeping film 4022 is configured to only emit light having an included angle within 30 degrees with respect to the normal direction of the anti-peeping film 4022.

Figure 19:
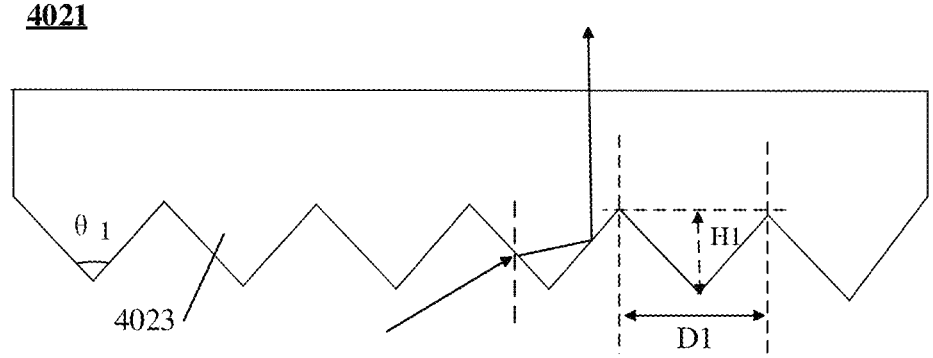
FIG. 19 is a schematic cross-sectional view of an inverse prism of a backlight assembly of a display device provided by at least one embodiment of the present disclosure.

For example, FIG. 19 shows a schematic cross-sectional view of an inverse prism 4021. As shown in FIG. 19, one surface of the inverse prism 4021 (for example, the surface of the inverse prism 4021 facing the surface light source 401, that is, the lower surface shown in the figure) includes a plurality of prismatic protrusions 4023 arranged in parallel, and the cross section of the prismatic protrusion 4023 is triangular. In such case, the prismatic protrusions 4023 are triangular prismatic protrusions. For example, the apex angle θ1 of the triangle can be 40-75 degrees, such as 50, 60 or 70 degrees, the base D1 of the triangle can be 20-50 μm, such as 30 μm or 40 μm, and the height H1 of the triangle can be 10-25 μm, such as 15 μm or 20 μm. As shown by the arrow in FIG. 19, the prismatic protrusion 4023 of the inverse prism 4021 can refract the light emitted from the surface light source 201 in the direction perpendicular to the surface of the display panel, thereby realizing the collimation effect of the light; furthermore, the inverse prism 4021 can also keep the brightness of the backlight above 20000 nit, thereby providing a backlight with sufficient brightness for the display panel to be used for display or forming a photosensitive light source.

Figure 20:
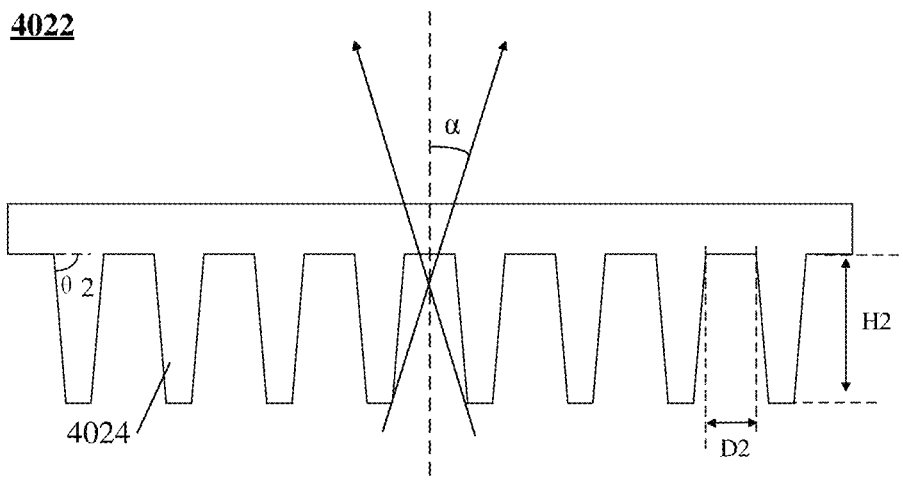
FIG. 20 is a schematic cross-sectional view of an anti-peeping film of a backlight assembly of a display device provided by at least one embodiment of the present disclosure.

For example, FIG. 20 shows a schematic cross-sectional view of an anti-peeping film 4022. As shown in FIG. 20, one surface of the anti-peeping film 4022 (shown as the lower surface in the figure, and in some embodiments, it can also be the upper surface) includes a plurality of prismatic protrusions 4024 arranged in parallel, and the cross section of the prismatic protrusion 4024 is trapezoid (for example, isosceles trapezoid) or rectangular. In such case, the prismatic protrusions 4024 are quadrangular prismatic protrusions. For example, the base angle θ2 of the trapezoid is 60-90 degrees, such as 70 degrees or 80 degrees; when θ2 is 90 degrees, the cross section of the prismatic protrusion 4024 is rectangular. For example, the height H2 of the trapezoid may be 300 μm-600 μm, such as 400 μm or 500 μm, and the distance D2 between adjacent trapezoids may be 25 μm-65 μm, such as 30 μm, 47 μm or 55 m. As shown by the arrow in FIG. 20, the anti-peeping film 4022 can only emit light having an included angle α within 30 degrees with respect to the normal direction of the anti-peeping film 4022 (i.e., the vertical direction in the figure), while the light having an included angle greater than 30 degrees with respect to the normal direction of the anti-peeping film 4022 will not be emitted, so that the anti-peeping film 4022 can further realize the collimation effect of light and function for anti-peeping in an extending direction perpendicular to the prismatic protrusions 4024.

For example, in some embodiments, the extending direction of the plurality of prismatic protrusions 4024 is perpendicular to the extending direction of the scanning line G extending between two adjacent rows of sub-pixels in the display panel, so that the anti-peeping film 4022 has an anti-peeping effect in the extending direction of the photosensitive element 1011, which can prevent from the crosstalk of light in the extending direction of the photosensitive element 1011, thereby improving the working quality of the photosensitive element 1011.

For example, in some embodiments, the inverse prism and the anti-peeping film may be a film with a prism structure formed by UV (Ultra-Violet) curable resin material on the surface of PET (Polyethylene terephthalate) matrix material, and the materials of the inverse prism and the anti-peeping film are not specifically limited in the embodiments of the present disclosure.

For example, in some embodiments, as shown in FIG. 16, the surface light source 401 may further include a reflective layer 403 located at the side of the light guide plate 4011 away from the inverse prism 4021, that is, the lower side in FIG. 16. The reflective layer 403 can reflect light, so that the light emitted by the surface light source can be emitted towards the inverse prism 4021 as much as possible, thereby improving the utilization rate of the light source. For example, the reflective layer 403 may be a metal layer formed on the surface of the light guide plate away from the inverse prism by evaporation or the like, or may be a metal plate arranged at the side of the light guide plate away from the inverse prism.

For example, in some embodiments, as shown in FIG. 16, the backlight assembly 400 may further include a back plate 404, which is arranged at the side of the reflective layer 403 away from the inverse prism 4021 and is made of resin, metal and other materials, for example. The back plate 404 can support and protect the above structure of the backlight assembly 400.

Figure 21:
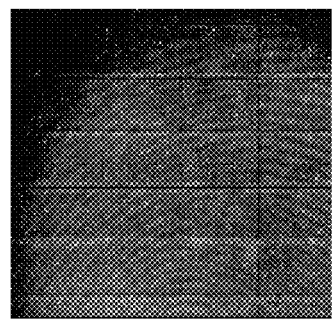
FIG. 21 illustrates a texture image acquired by a display device provided by at least one embodiment of the present disclosure.

For example, FIG. 21 shows a texture image acquired by the display device provided by at least one embodiment of the present disclosure. The display panel of the display device, for example, has a light shielding layer as shown in FIG. 6 and an image sensor structure as shown in FIG. 7. As can be seen from FIG. 21, the texture image acquired by the display device provided by this embodiment of the present disclosure is clear and has a large enough size, so that when used for texture recognition, an accurate texture recognition effect can be obtained, and phenomena such as unrecognizable textures or recognition errors can be avoided.

The following points need to be explained:
(1) The drawings of the embodiments of the present disclosure only refer to the structures related to the embodiments of the present disclosure, and other structures can refer to the general design.
(2) For the sake of clarity, in the drawings used to describe the embodiments of the present disclosure, the thickness of layers or areas is enlarged or reduced, that is, these drawings are not drawn to actual scale. It can be understood that when an element such as a layer, film, region or substrate is said to be located "above" or "below" another element, the element may be located "directly" above or below another element or intervening elements may exist.
(3) Without conflict, the embodiments of the present disclosure and the features in the embodiments can be combined with each other to obtain new embodiment(s).

The above are only the specific embodiments of the present disclosure, but the scope of protection of the present disclosure is not limited to this, and the scope of protection of the present disclosure should be subject to the scope of protection of the claims.

What is claimed is:

1. A display panel having a touch side and comprising an array substrate and an opposite substrate arranged opposite to each other,
wherein the array substrate comprises an image sensor array comprising a plurality of image sensors, and each of the plurality of image sensors comprises a photosensitive element configured to receive light reflected by a texture touched on the touch side for texture acquisition; and
the opposite substrate comprises a light shielding layer comprising a plurality of first openings arranged in an array, and the plurality of first openings are in one-to-one correspondence with and at least partially overlap with the photosensitive elements of the plurality of image sensors in a direction perpendicular to a panel surface of the display panel;
wherein for one first opening and one image sensor that are correspondingly arranged, an orthographic projection of the first opening on the panel surface of the display panel is inside an orthographic projection of the photosensitive element of the image sensor on the panel surface of the display panel; and
wherein for one first opening and one image sensor that are correspondingly arranged, a distance between an edge of the orthographic projection of the first opening on the panel surface of the display panel and an edge of the orthographic projection of the photosensitive element of the image sensor on the panel surface of the display panel is 0 μm to 5 μm.

2. The display panel according to claim 1, wherein the array substrate further comprises a plurality of sub-pixels arranged in an array, the light shielding layer further comprises a plurality of second openings arranged in an array and a plurality of color filters respectively arranged in the plurality of second openings, and
the plurality of color filters are in one-to-one correspondence with and at least partially overlap with the plurality of sub-pixels in the direction perpendicular to the panel surface of the display panel.

3. The display panel according to claim 2, wherein each of the plurality of image sensors further comprises at least one switching element,
the photosensitive element comprises a first electrode, a second electrode and a semiconductor layer between the first electrode and the second electrode, wherein the first electrode is electrically connected with the at least one switching element through a first via hole, and
the semiconductor layer partially overlaps with or has no overlap with the first via hole in the direction perpendicular to the panel surface of the display panel.

4. The display panel according to claim 3, wherein the array substrate further comprises a base substrate and a first planarization layer, wherein,
the at least one switching element is arranged on the base substrate, and the at least one switching element comprises a switching transistor, the switching transistor comprises an active layer, a gate electrode and a source-drain electrode; the first planarization layer is arranged at a side of the switching transistor away from the base substrate to provide a flat surface; the first electrode is arranged at a side of the first planarization layer away from the base substrate; the first planarization layer has the first via hole; and the first electrode is electrically connected with the source-drain electrode through the first via hole.

5. The display panel according to claim 4, wherein each of the plurality of sub-pixels comprises a pixel driving circuit, the pixel driving circuit is arranged on the base substrate and comprises a thin film transistor, and the thin film transistor is arranged in a same layer as the switching transistor.

6. The display panel according to claim 5, wherein the array substrate further comprises a first connection electrode, a second planarization layer, a second connection electrode and a connection trace, wherein
the first planarization layer also has a second via hole, the first connection electrode is electrically connected with a source-drain electrode of the thin film transistor through the second via hole, and the first connection electrode and the first electrode are arranged in a same layer;
the semiconductor layer and the second electrode are sequentially arranged on the first electrode;
the second planarization layer is arranged at a side of the first connection electrode and the second electrode away from the base substrate, the second planarization layer has a third via hole and a fourth via hole, the second connection electrode is electrically connected with the first connection electrode through the third via hole, the connection trace is electrically connected with the second electrode through the fourth via hole, and the connection trace is arranged in a same layer as the second connection electrode.

7. The display panel according to claim 6, wherein the array substrate further comprises a third planarization layer and a pixel electrode, wherein
the third planarization layer is arranged at a side of the second connection electrode and the connection trace away from the base substrate, and the third planarization layer has a fifth via hole through which the pixel electrode is electrically connected with the second connection electrode.

8. The display panel according to claim 7, further comprising a common electrode, wherein
the common electrode is arranged on the array substrate and insulated from the pixel electrode through an insulating layer; or
the common electrode is arranged on the opposite substrate.

9. The display panel according to claim 3, wherein the at least one switching element comprises a first switching transistor, a second switching transistor and a third switching transistor, the first electrode is electrically connected with a source-drain electrode of the third switching transistor through the first via hole, the first electrode is also electrically connected with a gate electrode of the second switching transistor, and a source-drain electrode of the second switching transistor is electrically connected with a source-drain electrode of the first switching transistor.

10. The display panel according to claim 2, wherein the plurality of sub-pixels are arranged in an array of multiple rows and multiple columns,
the display panel also comprises a scanning line extending between two adjacent rows of sub-pixels, and the scanning line is configured to provide a scanning signal for the plurality of sub-pixels,
at least some of the plurality of image sensors are arranged between two adjacent rows of sub-pixels, and an extending direction of the photosensitive elements of the at least some of the plurality of image sensors is as same as an extending direction of the scanning line.

11. The display panel according to claim 10, wherein the photosensitive elements of the at least some of the plurality of image sensors have no overlap with the scanning line in the direction perpendicular to the panel surface of the display panel.

12. The display panel according to claim 1, wherein a planer shape of each of the plurality of first openings is square or rectangular shape, and a length×a width of the planer shape is 10 μm×10 μm to 50 μm×50 μm.

13. The display panel according to claim 1, further comprising a liquid crystal layer between the array substrate and the opposite substrate,
wherein the display panel is configured to control the liquid crystal layer in response to a control signal so that a first area is in a light-transmitting state.

14. A display device, comprising:
the display panel according to claim 1, and
a backlight assembly arranged at a side of the array substrate away from the opposite substrate and configured to provide backlight for the display panel in operation.

15. The display device according to claim 14, wherein the backlight assembly comprises a surface light source and a light constraining layer,
the light constraining layer is located at one side of the surface light source close to the display panel, and is configured to constrain light emitted from the surface light source in the direction perpendicular to the panel surface of the display panel.

16. The display device according to claim 15, wherein the surface light source comprises a light guide plate and at least one light-emitting element arranged at at least one side of the light guide plate, and light emitted by the at least one light-emitting element is incident into the light guide plate from the at least one side and exits from a plate surface of the light guide plate facing the light constraining layer; or the surface light source comprises a light-emitting element array comprising a plurality of light-emitting elements arranged in multiple rows and multiple columns in a plane parallel to the display panel.

17. The display device according to claim 15, wherein the light constraining layer comprises an inverse prism and an anti-peeping film, and the inverse prism is arranged at a side of the anti-peeping film close to the surface light source, the inverse prism is configured to collimate the light emitted from the surface light source in the direction perpendicular to the panel surface of the display panel by means of refraction effect; and the anti-peeping film is configured to only emit light having an included angle within 30 degrees with respect to a normal direction of the anti-peeping film.

18. The display device according to claim 17, wherein the anti-peeping film comprises a plurality of prismatic protrusions arranged in parallel, and an extending direction of the plurality of prismatic protrusions is perpendicular to an extending direction of a scanning line extending between two adjacent rows of sub-pixels in the display panel.

* * * * *